United States Patent [19]

Been

[11] Patent Number: 4,667,427

[45] Date of Patent: May 26, 1987

[54] DISPLAY PANEL ASSEMBLY FOR FLUID PROCESS SYSTEM

[75] Inventor: Thomas S. Been, Saratoga, Calif.

[73] Assignee: Process and Cryogenic Services, Inc., San Jose, Calif.

[21] Appl. No.: 775,878

[22] Filed: Sep. 13, 1985

[51] Int. Cl.$^4$ .............................................. G09F 13/00
[52] U.S. Cl. ....................................... 40/442; 434/126
[58] Field of Search ................... 40/442, 444; 434/126, 434/430, 268, 219, 224, 298; 116/264

[56] References Cited

U.S. PATENT DOCUMENTS

| | | | |
|---|---|---|---|
| 959,440 | 5/1910 | Blits | 40/442 |
| 2,655,176 | 10/1953 | Dreyfuss et al. | 434/219 |
| 3,054,204 | 9/1962 | Yates | 434/126 |
| 3,582,927 | 6/1971 | Primavera | 434/430 |
| 3,688,008 | 8/1972 | Krieger, Sr. | 40/442 |
| 3,715,822 | 2/1973 | Hansen, Jr. et al. | 40/442 |
| 4,048,739 | 9/1977 | Brenton, Jr. | 40/442 |
| 4,613,952 | 9/1986 | McClanahan | 434/219 |

FOREIGN PATENT DOCUMENTS 770860 11/1967 Canada ............................... 434/430

Primary Examiner—Gene Mancene
Assistant Examiner—Cary E. Stone
Attorney, Agent, or Firm—Townsend and Townsend

[57] ABSTRACT

An assembly of a display panel and a mounting base for a plurality of light-emitting elements. The mounting base is adjacent to one side of the display panel, and the display panel has a plurality of light-transmitting apertures, holes or openings representing at least two different fluid flow paths and specific fluid devices, such as valves and fluid containing cylinders. A microprocessor is used to control the operation of voltage sources coupled to the light-emitting elements so that, by selectively actuating a first set of light-emitting elements, a visual representation of a first fluid flow path can be provided to indicate the flow of a first gas from one location to another. Alternately, the assembly can be operated such that a second fluid flow path can be visually represented while the light elements of the first path are deactuated. Thus, by a glance at the display panel, an operator can visually determine which one of several fluids is flowing in a fluid flow system while also determining the state of operation of one or more fluid devices in the flow path.

7 Claims, 4 Drawing Figures

DISPLAY PANEL ASSEMBLY FOR FLUID PROCESS SYSTEM

This invention relates to improvements in the handling of fluids flowing from fluid sources, such as gas cylinders, and more particularly, to an improved assembly for visually representing the flow of fluids along different fluid flow paths.

BACKGROUND OF THE INVENTION

In a fluid process system, fluid flow along any one of several paths is typically indicated by the state of operation of one or more meters or other instruments as well as the on-off status of a single light source, such as a light adjacent to an operating switch. Such visual indicators are satisfactory but do not provide a satisfactory representation in many cases of the path along which a fluid is flowing between a pair of locations in a fluid flow system. It is desirable that a more reliable indication of a fluid flow be shown at a glance to an operator of a fluid flow system.

Because of the lack of such a reliable indication, a need exists for an improved display means to indicate in visually observable form, the several paths along which fluids of different types are flowable in a single fluid flow system. The present invention satisfies this need.

SUMMARY OF THE INVENTION

The present invention is directed to an improved display panel assembly for use with fluid flow system which operates in a manner such that several different fluids are alternately flowable through the system to perform specific functions. For example, a process gas can provided in a fluid flow system for use in performing a specific chemical or other process, while a purge gas can be provided for purging the fluid flow system of a previously used process gas.

The present invention includes a display panel having a plurality of aligned, light-transmitting apertures or holes therethrough which can be used to represent two or more fluid flow paths of different size, shape and function. Certain of the paths can be provided with light-transmitting openings representing fluid devices, such as valves.

To illuminate the holes and openings in the display panel, light means is provided, such light means including light-emitting elements aligned with respective holes and openings to allow light to pass therethrough and thereby present to an observer of the display panel any one of several paths of a particular fluid flow and the state of operation of fluid devices in such path, such as valves and the like.

The actuation of the light-emitting elements in a particular sequence causes the several fluid flow paths to be visually represented at different times and in different colors. Thus, the flow of a first or process gas can be represented by a series of actuated light elements whose light beams are transmitted through the apertures or holes or openings of the display panel and observed as light of a particular color, such as red colored light. A flow path of a second fluid can be visually represented as a series of light spots of a second color emanating from and transmitted through the display panel. Thus, an operator of the fluid flow system using the display panel assembly of the present invention can tell at a glance which one of several fluids is flowing and the source and end use location of the fluid flow as well as the state of operation of certain fluid devices in the path, such as valves or the like. In this way, the operator can have a greater amount of time to control or perform other process steps while having the knowledge and assurance that the fluid flow represented by a particular light arrangement on the display panel is fully operable and can be selectively changed, if desired.

The primary object of the present invention is to provide an improved display panel assembly for a fluid process system wherein the assembly permits visual observation at a glance of the state of operation of the fluid process system when the latter system can be operated selectively to cause several different fluids to flow along respective paths.

Other objects of this invention will become apparent as the following specification progresses, reference being had to the accompanying drawings for an illustration of the invention.

IN THE DRAWINGS

Figure 1:
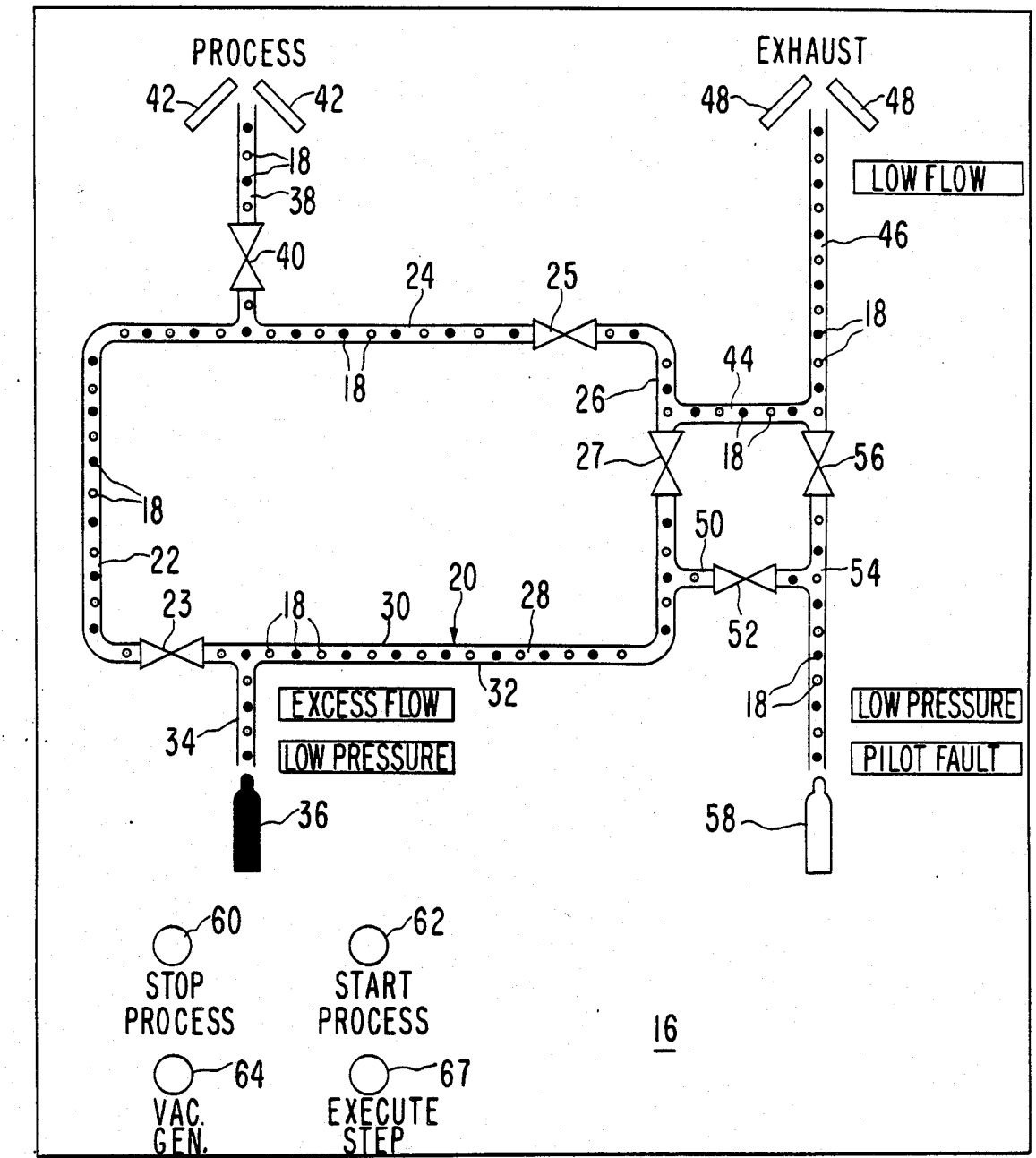
FIG. 1 is a front elevational view of a display panel assembly for a fluid process system.

The display panel assembly of the present invention is broadly denoted by the numeral 10 and includes a display panel 12 mounted adjacent to a mounting base 14. Display panel assembly 10 is adapted to be used with a fluid process system in which two types of fluids, such as a process gas and a purging gas, are caused to flow along respective fluid paths for specific purposes. For example, the process gas is flowable from a first gas cylinder to a location at which the process gas is used to perform a specific process, and the purging gas is flowable from a second gas cylinder for purging the process gas line. The purpose of display panel assembly 10 of the present invention is to provide a visual representation of the flow of either of the process gas or the purge gas so that a glance at panel 12 will readily establish which gas is flowing and along which path.

Display panel 12 is provided with symbols representing flow paths, valves, gas cylinders, and process steps, all of which are provided with light means hereinafter described. The light means includes a number of light-emitting elements which are selectively actuated so as to provide a visual indication of a specific fluid flow which is taking place in a particular process sequence. Thus, when looking at the display panel, the operator of the fluid process system will know immediately that either the process gas is flowing along a first path or the purge gas is flowing along a second path. Thus, display panel assembly 10 of the present invention is automatic and is provided with features which do not require the operator to look at meters or other instruments to establish the state of operation of the fluid flow paths of the system.

Panel 12 includes a body 16 of relatively rigid sheet material. Body 16 can be of a suitable plastic, such as a polycarbonate material.

Body 12 is provided with a plurality of relatively small light-transmitting holes therethrough, the holes being preferably covered by colored material which is relatively thin. The colors are chosen to symbolize a particular gas. Thus, for instance, one of the colors can be red to indicate the flow of a process gas, and another color can be green to indicate the flow of a purge gas. The holes need not be drilled through body 16. They can be formed by light-transmitting openings in the body 16 if body 16 is of a transparent or clear plastic material.

The holes 18 are arranged to represent a closed loop 20 comprised of segments 22, 24, 26 and 28. Each of the segments is provided with a number of spaced, aligned holes 18 bounded on the sides by lines 30 and 32. In each segment, alternate holes are provided with material of one color and the remaining holes are provided with material of another color. Thus, a green colored hole is between each pair of adjacent red colored holes.

Other fluid path symbols coupled to loop 20 include a segment 34 defined by a series of aligned, colored holes leading from a colored opening 36 representing a process gas cylinder. Another segment 38 defined by a series of aligned, colored holes and having a colored opening 40 representing a valve is coupled to segment 24 of loop 20. Valve symbol 40 is in the form of two triangular openings which form a bow tie configuration. At the outer end of segment 38, a pair of inclined, rectangular, colored openings 42 are provided to indicate an arrow, and thereby the direction of flow of process gas to the process system which uses the process gas.

Other segments coupled to loop 20 include a segment 44 of aligned, colored holes coupled to segment 26, and a segment 46 of aligned, colored holes, segment 46 having at its outer end pair of inclined, colored openings 48 representing an arrow to indicate the flow of purge gas to the atmosphere. A segment 50 of aligned, colored holes has a colored opening 52 representing segment 50. A valve is coupled to segment 28 and to a segment 54 of aligned, colored holes, segment 54 being coupled by an opening defining a valve symbol 56 to segment 46. The lower end of segment 54 is symbolically coupled to an opening 58 defining a second gas cylinder to provide a purge gas for the system.

In addition to the foregoing, panel body 16 has a number of push-button switches 60, 62, 64 and 67 coupled to electrical circuitry (not shown) of the fluid process system of which display panel system forms a part. Such switches are used to cause the following sequence steps: stop process, start process, actuate vacuum generator and execute step.

Figure 2:
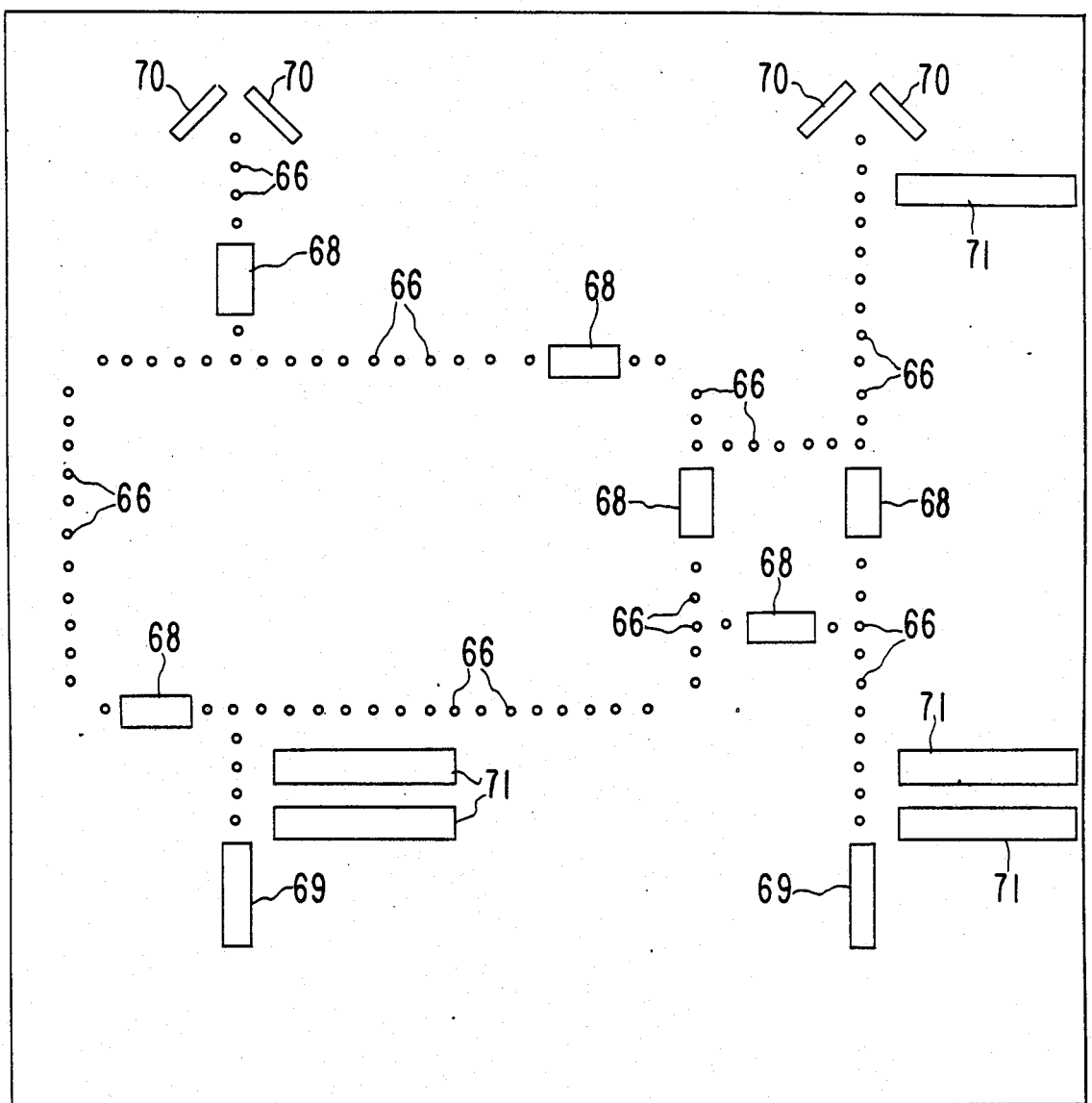
FIG. 2 is a front elevational view of a mounting base for use with the panel of FIG. 1, the base having light sources thereon for illuminating respective locations of a display on the display panel.
Figure 3:
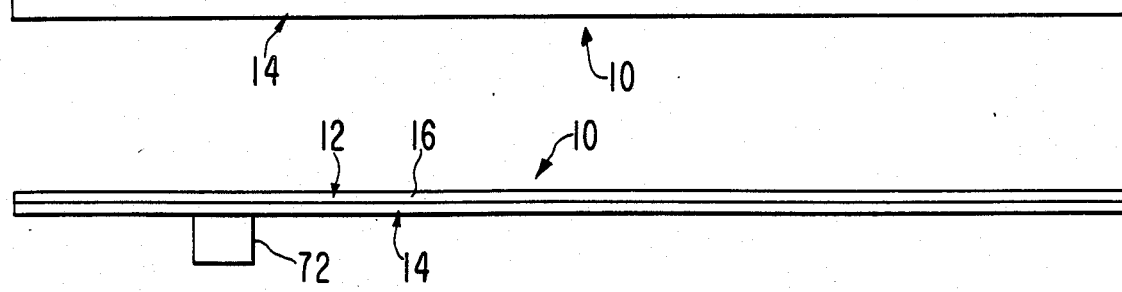
FIG. 3 is a schematic end elevational view of the display panel assembly of the present invention, showing the way the in which the display panel of FIG. 1 is positioned adjacent to the mounting base of FIG. 2.

To illuminate the symbolic fluid paths represented by various holes 18, valve symbols 40 and cylinder symbols 36 and 58, a plurality of light sources are provided. These are shown in FIG. 2 in which a plurality of light-emitting diodes 66 are mounted on board 14 in the same sequence as are holes 18 as shown in FIG. 1. Diodes 66 can emit white light if holes 18 are provided with colored material, such as red and green material to indicate process and purge gas flows. In the alternative, the diodes 66 can be made so that they emit a colored light. For example, the envelopes of the diodes are of colored glass. Light bars 68 are provided for alignment with respective valve symbols 40, 23, 25, 27, 52 and 56. Second light bars 70 are provided to illuminate the arrow-defining openings 42 and 48 of FIG. 1. Third light bars 71 are used to illuminate certain labels indicating flow characteristics.

Figure 4:
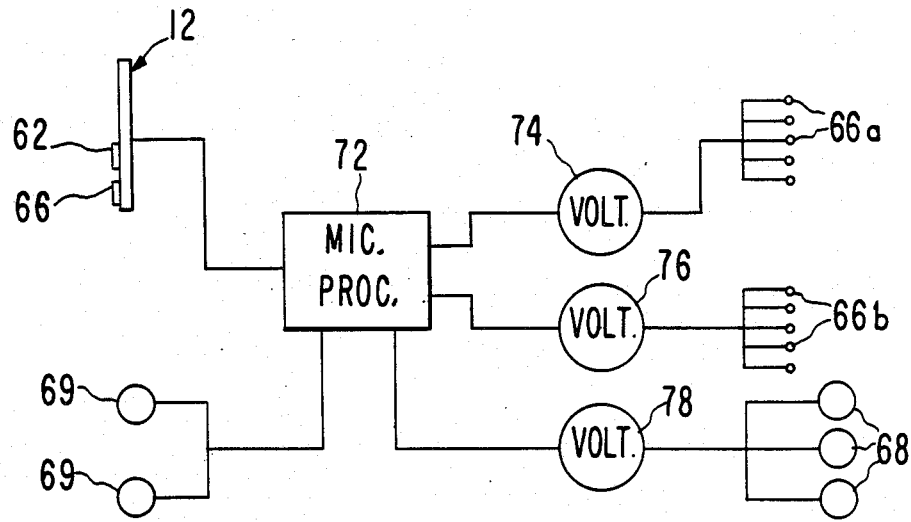
FIG. 4 is a schematic diagram of a circuit including a microprocessor for controlling the light-emitting elements on the mounting base of FIG. 2.

A microprocessor 72, (FIG. 4) is mounted on base 14 and is used to control voltage sources 74 and 76 to two sets of light-emitting diodes 66 so that the two paths defined by the various segments containing colored holes 18 can be alternately illuminated. Microprocessor 72 also is coupled through a voltage source 78 to the various light bars aligned with the openings representing the valves in the various segments of display panel body 16.

In use, when push button 62 is actuated, the valves in the fluid process system represented by symbols 25, 27 and 52 and 56 (FIG. 1) are closed so that process gas will flow from the respective gas cylinder represented by opening 36 along segments 34, 22 and 38 and to the process location where the process is to be performed. When this occurs, diodes 66a (FIG. 4) associated with the particular color representing the flow of process gas, such as the red color, will be energized while the other diodes 66b (FIG. 4) will remain unenergized. Thus, alternate diodes adjacent to segments 34, 22 and 38 will be actuated as will light bars 42 indicating the direction of flow of the process gas to the process location. Also, the light bar 69 associated with the process gas cylinder 36 will be energized to indicate that the gas is flowing from the cylinder.

When it is desired to stop the process flow of gas, push button 60 is energized, whereupon the valves associated with symbols 40, 27 and 56 will be closed, and valves 52 and 25 will be opened. This is done by actuating the push button 64 which will couple a suction device, such as the inlet of a blower, to the gas line represented by segment 46. When push button 64 is energized or actuated, purge gas flow is indicated by light from diodes 66 of green color and light bars 68 of green color. Thus, the purge gas flow is indicated as being through valve 52, through segment 28, valve 23, through segment 22, segment 24, through valve 25, through segment 26, through segments 44 and 46 and out of the system to the atmosphere or an exhaust chamber. Alternate diodes 66 along the aforesaid segments and corresponding to the green color will be energized while the other (red) diodes 66 will remain off. Also, the light bars 68 aligned with valve symbols 40 and 56 will be energized to indicate that the corresponding valves are closed to the flow of the purging gas.

I claim:

1. In a fluid process system, a display panel assembly comprising:

a display panel having a plurality of aligned light transmitting holes for representing at least two different fluid flow paths, a first set of holes defining a first of the paths for indicating the flow of a first fluid from a first location to a second location, a second set of holes defining a second path for indicating the flow of a second fluid from a third location to a fourth location, whereby the first fluid can be considered a process gas flowable between the first and second locations, and the second fluid can be considered a purge gas capable of purging said process gas from said portion of the first path; and light means adjacent to said display panel and being selectively actuated for providing a symbolic representation of the flow of said fluids along the first and second paths, said light means including a first group of light sources for said first set of holes and a second group of light sources for said second set of holes, at least a part of the second group of light sources being in at least a segment of the first path, whereby the light sources can indicate how a purge gas can purge the first fluid path of a process gas.

2. In a fluid process system as set forth in claim 1, wherein the holes are substantially covered with light-transmitting material, the holes representing the first path having material of a first color and the holes representing the second path having a material of a second color.

3. In a fluid process system as set forth in claim 1, wherein said light sources include a plurality of light-emitting elements, and a base for supporting the elements, said base being adjacent to one side of said display panel.

4. In a fluid process system as set forth in claim 3, wherein a number of said elements are light-emitting diodes mounted adjacent to one face of said base in alignment with respective holes.

5. In a fluid process system as set forth in claim 3, wherein the elements include a number of light-emitting bars, and including means defining light-transmitting openings in the display panel in alignment with and at spaced locations along respective paths to symbolically represent fluid control devices, said bars being in alignment with respective openings.

6. In a fluid process system as set forth in claim 3, wherein said light means includes means for controlling the light-emitting elements so that the elements associated with one of said paths can be operated as the elements of the other path remain deactuated and vice versa.

7. In a fluid process system as set forth in claim 6, wherein said control means includes a microprocessor.

* * * * *